United States Patent
Chakraborty et al.

(10) Patent No.: US 10,291,309 B2
(45) Date of Patent: May 14, 2019

(54) ROBUST UPLINK BEAM MANAGEMENT

(71) Applicant: QUALCOMM Incorporated, San Diego, CA (US)

(72) Inventors: Kaushik Chakraborty, San Diego, CA (US); Tao Luo, San Diego, CA (US); Xiao feng Wang, San Diego, CA (US); Makesh Pravin John Wilson, San Diego, CA (US); Shengbo Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/887,806

(22) Filed: Feb. 2, 2018

(65) Prior Publication Data

US 2018/0278318 A1    Sep. 27, 2018

Related U.S. Application Data

(60) Provisional application No. 62/476,373, filed on Mar. 24, 2017.

(51) Int. Cl.

| H04B 7/02 | (2018.01) |
| H04B 7/06 | (2006.01) |
| H04W 52/14 | (2009.01) |
| H04B 7/0404 | (2017.01) |
| H04B 7/0408 | (2017.01) |
| H04B 7/08 | (2006.01) |
| H04W 52/36 | (2009.01) |
| H04W 52/42 | (2009.01) |

(Continued)

(52) U.S. Cl.
CPC ......... *H04B 7/0695* (2013.01); *H04B 7/0404* (2013.01); *H04B 7/0408* (2013.01); *H04B 7/088* (2013.01); *H04W 52/146* (2013.01); *H04W 52/16* (2013.01); *H04W 52/367* (2013.01); *H04W 52/42* (2013.01); *H04B 7/024* (2013.01)

(58) Field of Classification Search
CPC ........................... H04B 7/0695; H04W 52/146
USPC ........................................................ 375/267
See application file for complete search history.

(56) References Cited

U.S. PATENT DOCUMENTS

| 7,570,922 B2 | 8/2009 | Williams |
| 8,781,437 B2 | 7/2014 | Ngai et al. |

(Continued)

FOREIGN PATENT DOCUMENTS

WO    2016018121 A1    2/2016

OTHER PUBLICATIONS

International Search Report and Written Opinion—PCT/US2018/016868—ISA/EPO—dated May 15, 2018.

*Primary Examiner* — Helene E Tayong
(74) *Attorney, Agent, or Firm* — Loza & Loza, LLP

(57) ABSTRACT

Various aspects of the disclosure relate to managing the transmission of uplink beams. For example, a first apparatus may generate a signal for transmission to a second apparatus. Thereafter, the first apparatus may detect a condition associated with transmitting the signal via a first uplink beam at a first transmission power. The condition may include the first uplink beam exceeding a maximum permissible exposure (MPE) limit. Accordingly, the first apparatus may refrain from transmitting the signal via the first uplink beam based on the at least one condition and transmit the signal to the second apparatus using a second uplink beam different from the first uplink beam.

26 Claims, 9 Drawing Sheets

(51) Int. Cl.
*H04W 52/16* (2009.01)
*H04B 7/024* (2017.01)

(56) References Cited

U.S. PATENT DOCUMENTS

| | | | |
|---|---|---|---|
| 9,026,059 B2 | 5/2015 | Shi et al. | |
| 9,107,169 B2 | 8/2015 | Kwun et al. | |
| 9,307,499 B2 * | 4/2016 | Zehr | H01Q 1/243 |
| 2002/0081978 A1 | 6/2002 | Hou et al. | |
| 2013/0271322 A1 | 10/2013 | Harel et al. | |
| 2015/0349863 A1 | 12/2015 | El et al. | |

* cited by examiner

ROBUST UPLINK BEAM MANAGEMENT

CROSS-REFERENCE TO RELATED APPLICATIONS

This application claims priority to and the benefit of U.S. Provisional Patent Application No. 62/476,373, entitled "ROBUST UPLINK BEAM MANAGEMENT" filed on Mar. 24, 2017, the entire contents of which are incorporated herein by reference.

INTRODUCTION

Various aspects described herein relate to wireless communication and, more particularly but not exclusively, to managing the transmission of uplink beams.

In some multiple access wireless communication systems, several devices communicate with a base station. In some scenarios, the base station is equipped with multiple transmit antennas and multiple receive antennas. One example is a millimeter wave (mmW) system where multiple antennas are used for beamforming (e.g., in the range of 30 GHz, 60 GHz, etc.). Such a base station may communicate with the devices in a time-division-multiplexing (TDM) or time-division-duplexing (TDD) manner. For example, in a TDM system, the base station transmits to a first device in a first time interval and then to a second device subsequently in a second time interval. Often, the beamforming directions to these two devices are distinct. As a result, the base station may change its beamforming setting from the first time interval to the second time interval. In another example, in a TDD system, the base station may communicate with the first device and the second device simultaneously (i.e., in the same time interval) using two spatial beams and/or two different frequency resources.

FIG. 1 illustrates a communication system 100 where a mmW base station (BS) (or gNB) 102 communicates with a first mmW user equipment (UE) 104 and a second mmW UE 106 via different beamforming directions. As indicated by a set of beams 108, the mmW base station 102 may communicate via any one of a plurality of directional beams. As indicated by a set of beams 110, the first mmW UE 104 may communicate via any one of a plurality of directional beams. As indicated by a set of beams 112, the second mmW UE 106 may communicate via any one of a plurality of directional beams. For example, the base station 102 may communicate with the first mmW UE 104 via a first beamforming direction 114 and communicate with the second mmW UE 106 via a second beamforming direction 116.

The Federal Communications Commission (FCC) imposes exposure limits to radio frequency (RF) radiation from wireless devices. For sub-6 GHz bands, this is specified as a specific absorption rate (SAR) and for above 6 GHz bands, as a maximum permissible exposure (MPE). It is understood that the higher frequencies tend to interact with the skin surface while the lower frequencies tend to be absorbed in the volume. Therefore, SAR is expressed as power per unit volume while MPE as power per unit area. Specifically, the FCC MPE limit of concern for millimeter wave systems is 1 mW/cm$^2$. The international, ICNIRP limit, is more relaxed and is 20 mW/20 cm$^2$ (less stringent than the FCC limit because the power density can be met over a wider area). Additionally, for a UE, averaging using a "duty-cycle" is allowed.

Since free space losses and other losses for mmW systems may be much higher than the losses for sub-6 GHz systems, a higher effective isotropic radiated power (EIRP) for transmissions is generally desired. This is typically accomplished by using antenna arrays to steer the beam in the desired direction. The current EIRP limit from the FCC for UE-class devices in mmW systems (e.g., 24 GHz-60 GHz) is 43 dBm and for "transportable" class devices (e.g., customer premises equipment (CPEs) used in the home) the EIRP limit is 55 dBm. While a typical UE (e.g., a smartphone, a tablet, etc.) design may practically operate at much lower than 43 dBm (e.g. 26-30 dBm), there may still be a problem that, at those power levels, a beam pointed towards the body/skin of a person (or some other object subject to protection) by a handheld device could violate the MPE limits. For example, with FCC limits and 35 dBm EIRP, the MPE limit may be violated up to a distance of 15 centimeters (cm) from the antenna array. Thus, static rules for conformance could lead to severely limiting the value of these bands.

In some cases, a UE having knowledge of the MPE limits may detect a problem associated with its own uplink transmission not meeting the limits. In such cases, the UE may autonomously block the uplink transmission to ensure compliance with the MPE limits. However, a need to communicate with a wireless network via another device, such as a BS, still exists.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In some aspects, the disclosure provides an apparatus configured for communication that includes a memory device and a processing circuit coupled to the memory device. The processing circuit is configured to: generate a signal for transmission to a second apparatus, detect at least one condition associated with transmitting the signal via a first uplink beam at a first transmission power, refrain from transmitting the signal via the first uplink beam based on the at least one condition, and transmit the signal to the second apparatus using a second uplink beam different from the first uplink beam.

In some aspects, the disclosure provides a method of communication at an apparatus including: generating a signal for transmission to a second apparatus; detecting at least one condition associated with transmitting the signal via a first uplink beam at a first transmission power; refraining from transmitting the signal via the first uplink beam based on the at least one condition; and transmitting the signal to the second apparatus using a second uplink beam different from the first uplink beam.

In some aspects, the disclosure provides an apparatus configured for communication. The apparatus including: means for generating a signal for transmission to a second apparatus; means for detecting at least one condition associated with transmitting the signal via a first uplink beam at a first transmission power; means for refraining from transmitting the signal via the first uplink beam based on the at least one condition; and means for transmitting the signal to the second apparatus using a second uplink beam different from the first uplink beam.

In some aspects, the disclosure provides a non-transitory computer-readable medium of a first apparatus storing computer-executable code, including code to: generate a signal for transmission to a second apparatus; detect at least one condition associated with transmitting the signal via a first uplink beam at a first transmission power; refrain from transmitting the signal via the first uplink beam based on the at least one condition; and transmit the signal to the second apparatus using a second uplink beam different from the first uplink beam.

In some aspects, the disclosure provides an apparatus configured for communication that includes a memory device and a processing circuit coupled to the memory device. The processing circuit is configured to: transmit a downlink signal via a first downlink beam to a second apparatus, scan for an uplink signal from the second apparatus that corresponds to the downlink signal via a first uplink beam at a first transmission power, determine that the uplink signal from the second apparatus will not be received via the first uplink beam, and receive the uplink signal from the second apparatus using a second uplink beam different from the first uplink beam.

In some aspects, the disclosure provides a method of communication at an apparatus including: transmitting a downlink signal via a first downlink beam to a second apparatus; scanning for an uplink signal from the second apparatus that corresponds to the downlink signal via a first uplink beam at a first transmission power; determining that the uplink signal from the second apparatus will not be received via the first uplink beam; and receiving the uplink signal from the second apparatus using a second uplink beam different from the first uplink beam.

In some aspects, the disclosure provides an apparatus configured for communication. The apparatus including: means for transmitting a downlink signal via a first downlink beam to a second apparatus; means for scanning for an uplink signal from the second apparatus that corresponds to the downlink signal via a first uplink beam at a first transmission power; means for determining that the uplink signal from the second apparatus will not be received via the first uplink beam; and means for receiving the uplink signal from the second apparatus using a second uplink beam different from the first uplink beam.

In some aspects, the disclosure provides a non-transitory computer-readable medium of a first apparatus storing computer-executable code, including code to: transmit a downlink signal via a first downlink beam to a second apparatus; scan for an uplink signal from the second apparatus that corresponds to the downlink signal via a first uplink beam at a first transmission power; determine that the uplink signal from the second apparatus will not be received via the first uplink beam; and receive the uplink signal from the second apparatus using a second uplink beam different from the first uplink beam.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure relate to managing uplink beam transmissions. For example, an apparatus may generate a signal for transmission to a second apparatus. The apparatus may then detect at least one condition associated with transmitting the signal via a first uplink beam at a first transmission power (e.g., the first uplink beam exceeds a maximum permissible exposure (MPE) limit). Accordingly, the apparatus may refrain from transmitting the signal via the first uplink beam based on the at least one condition and transmit the signal to the second apparatus using a second uplink beam different from the first uplink beam.

In another example, the apparatus may transmit a downlink signal via a first downlink beam to a second apparatus and scan for an uplink signal from the second apparatus that corresponds to the downlink signal via a first uplink beam at a first transmission power. However, the apparatus may determine that the uplink signal from the second apparatus will not be received via the first uplink beam. Accordingly, the apparatus may receive the uplink signal from the second apparatus using a second uplink beam different from the first uplink beam.

Managing Uplink Beam Transmissions

Figure 2:
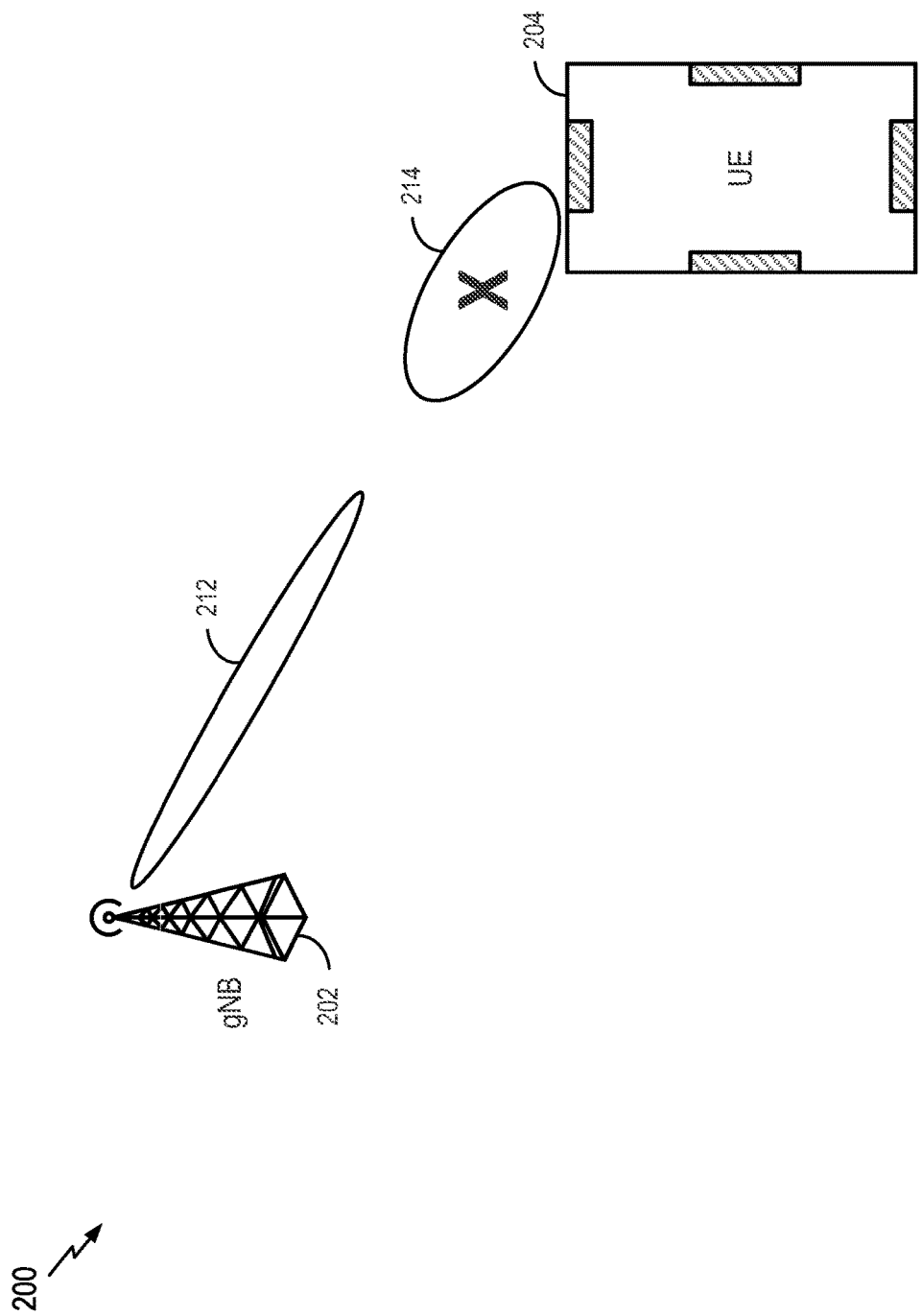
FIG. 2 illustrates a communication system that includes a first apparatus and a second apparatus in accordance with some aspects of the disclosure.

FIG. 2 illustrates a communication system 200 that includes a first apparatus 202 (e.g., a transmit receive point (TRP), a gNB, etc.) and a second apparatus 204 (e.g., a UE or a CPE). As an example, the first apparatus 202 will be referred to as a gNB 202 and the second apparatus 204 will be referred to as a UE 204. During an initial call setup phase, the gNB 202 may transmit a signal via a downlink beam 212 in an attempt to establish a communication link with the UE 204. The UE 204 may transmit a corresponding signal via an uplink beam 214 to close the communication link with the gNB 202. In a connected mode phase, the gNB 202 and the UE 204 have already established a communication link with each other and may exchange downlink and uplink data via the downlink beam 212 and the uplink beam 214, respectively. However, in some instances, such as during heavy downlink and/or uplink data activity, the UE 204 may detect a condition (blockage condition) rendering the uplink beam 214 unusable. In an aspect, the UE 204 may run an algorithm to detect the blockage condition due to proximate human tissue. For example, the UE 204 may detect that transmitting the signal via the uplink beam 214 would impinge on a portion of the human body (e.g., finger or hand of the user of the UE) and exceed a maximum permissible exposure (MPE) limit, such as when the user of the UE abruptly touches/handles the UE during a voice/data call, bringing the finger or hand of the user in close proximity of the UE's antenna arrays. In such a case, the UE 204 may immediately or subsequently decide that the uplink beam 214 cannot be used. Accordingly, the UE 204 may autonomously block the uplink beam 214. That is, prior to completing the uplink transmission via the uplink beam 214, the UE 204 may decide to refrain from transmitting, for example, to avoid violation of the MPE limit. In one aspect of the disclosure, the MPE limit may be affected by dynamic conditions relating to, for example, a maximum allowed transmission power, a beam shape, a beam direction, or a beam exposure to human tissue (tissue orientation, tissue distance, etc.).

Notably, the downlink beam 212 corresponding to the uplink beam 214 may not be impacted by the blockage condition. This is made possible, for example, if the gNB 202 uses a beam pair (downlink beam-uplink beam combination) for transmitting the downlink beam that is different from the beam pair used by the UE 204 for transmitting the uplink beam. In another example, even if the gNB 202 and the UE 204 were to use the same beam pair to perform their respective transmissions, the downlink beam 212 may not be affected by the blockage condition if the distance between the gNB 202 and the UE 204 was large enough such that the power of the downlink beam 212 is too low to exceed the MPE limit.

Figure 1:
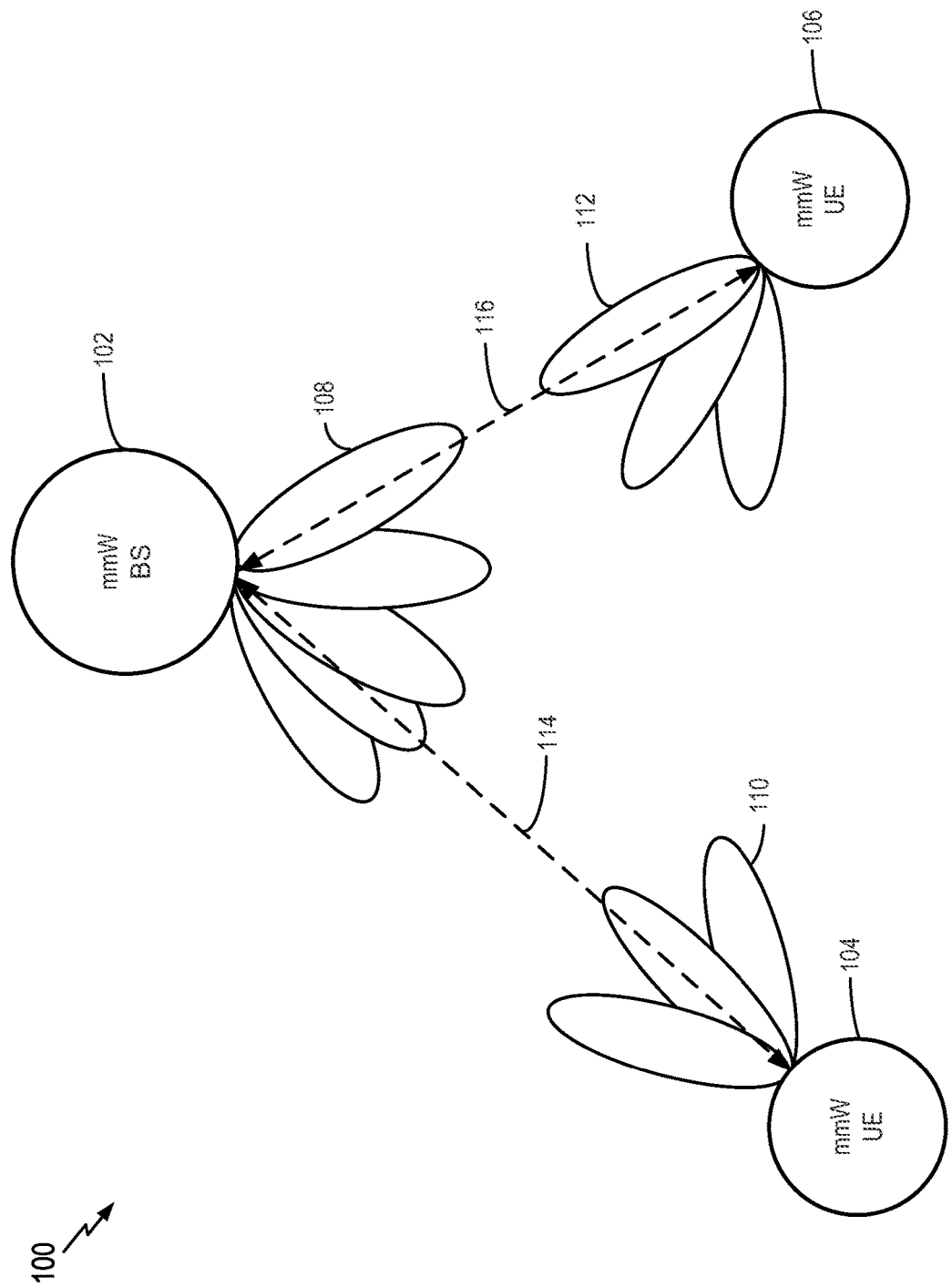
FIG. 1 illustrates an example communication system employing beamforming within which aspects of the disclosure may be implemented.

The first apparatus 202 and the second apparatus 204 may correspond to, for example, the mmW BS 102 and/or the mmW UEs 104 and 106 of FIG. 1. In some aspects, a TRP may refer to a physical entity that incorporates radio head functionality for a particular physical cell. This functionality may be similar in one or more aspects to (or incorporated into) the functionality of a NodeB (NB), an enhanced NodeB (eNB), a gigabit NodeB (gNB), a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar entity.

Figure 3:
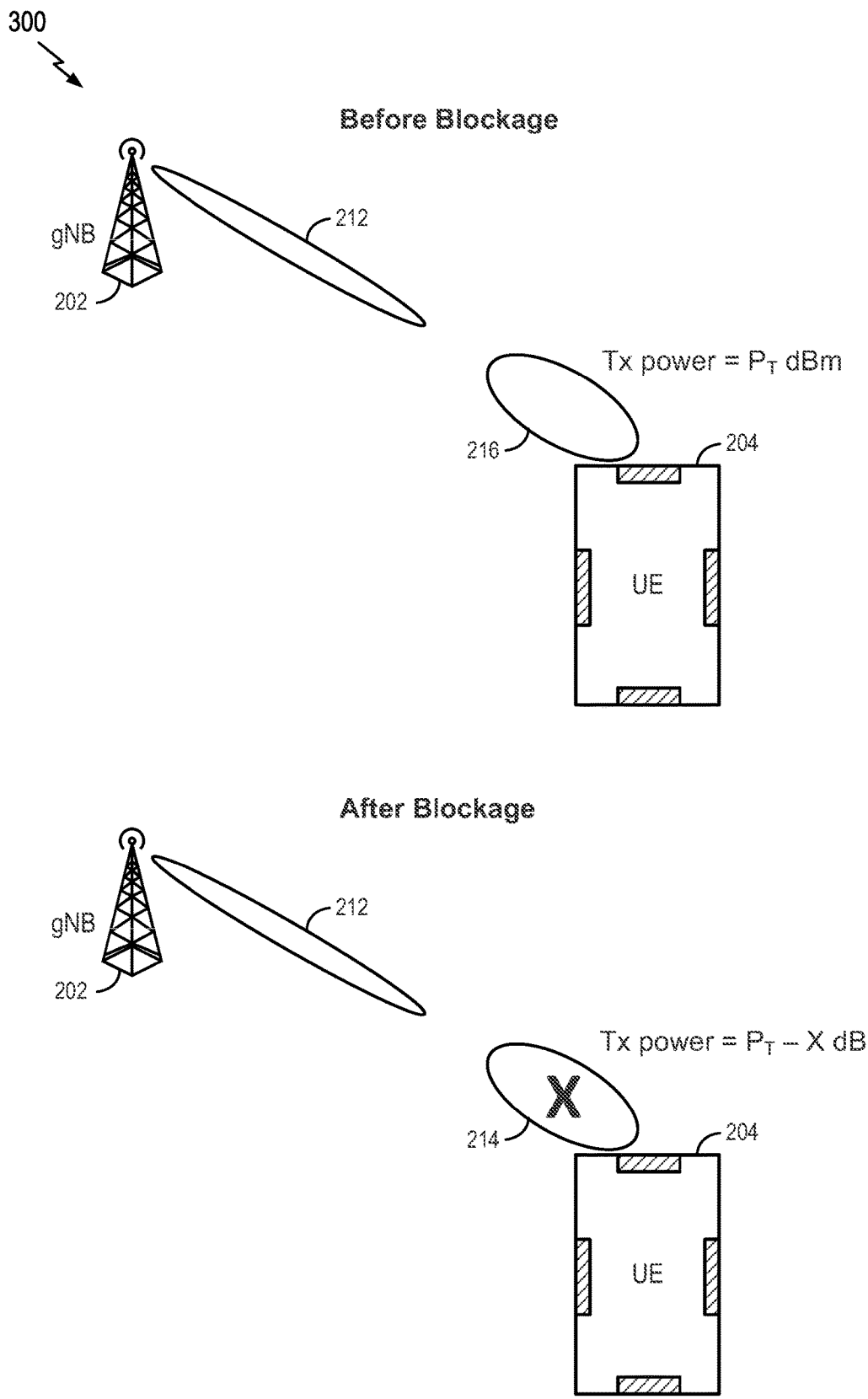
FIG. 3 is a diagram illustrating communication systems that include a gNB and a UE in accordance with some aspects of the disclosure.

FIG. 3 is a diagram 300 illustrating communication systems that include the gNB 202 and the UE 204 according to some aspects of the disclosure. In an aspect of the disclosure, when the blocking condition arises with respect to the uplink beam, the UE 204 may backoff the transmission power on the uplink beam before transmitting to the gNB 202.

For example, prior to the blockage condition occurring, the UE 204 may transmit an uplink beam 216 at a transmission (Tx) power=$P_T$ dBm. After the blockage condition occurs, the UE 204 may transmit the uplink beam 214 at a Tx power=$P_T-X$ dBm, where the UE 204 determines the power backoff required to be X dB. In this example, the uplink beam 214 is directed in a same direction as the uplink beam 216. In an aspect, the power backoff (X dB) may be determined autonomously by the UE 204 based on an internal algorithm such that the transmission on the uplink beam 214 does not exceed the MPE limit.

Figure 4:
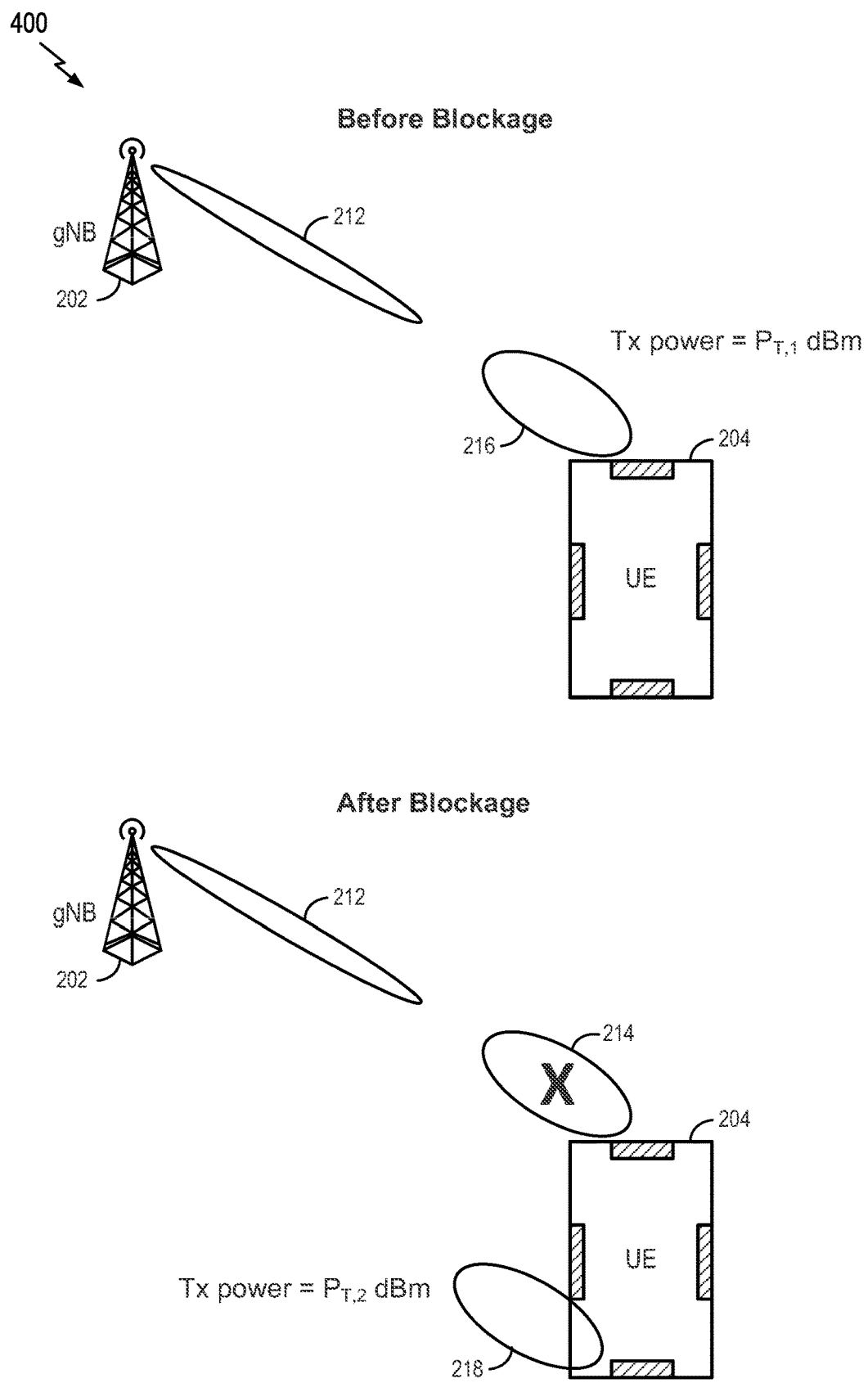
FIG. 4 is a diagram illustrating communication systems that include the gNB and the UE in accordance with some other aspects of the disclosure.

FIG. 4 is a diagram 400 illustrating communication systems that include the gNB 202 and the UE 204 according to some aspects of the disclosure. In an aspect of the disclosure, when a blocking condition arises with respect to a first uplink beam, the UE 204 may select a different uplink beam for transmission to the gNB 202.

For example, prior to the blockage condition occurring, the UE 204 may transmit a first uplink beam 216 (Tx beam 1) at a Tx power=$P_{T,1}$ dBm. After the blockage condition occurs (uplink beam 214), the UE 204 may select a second uplink beam 218 (Tx beam 2) and transmit at a Tx power=$P_{T,2}$ dBm. In this example, the second uplink beam 218 may be directed in a different direction than the first uplink beam 216. The second beam may be generated using the same or different antenna subarrays within the UE device. Notably, the gNB 202 may not be aware of the beam change occurring at the UE 204, and therefore may still aim the downlink beam 212 toward an original direction. In some scenarios, using a different uplink beam for transmission may result in a better chance of closing a communication link and/or continuing a data exchange compared to reducing the uplink transmission power as described above with respect to FIG. 3 as there may be a tradeoff between transmission power reduction and mismatched beam directions.

In one aspect, the second uplink beam 218 is selected such that the blockage condition is no longer a problem. In one example, the direction and/or transmit power is selected such that the blockage condition (e.g., exceeding the MPE limit) is no longer a problem. More specifically, this may involve selection of a beam for the second uplink beam 218 that is not obscured by a human body part such as a finger. In one aspect, the communication link between the UE 204 and gNB 202 may still be established (or the data exchange between the UE 204 and gNB 202 may continue) when the gNB 202 is unaware of the beam change occurring at the UE 204 and still aims the downlink beam 212 toward an original direction. In such case, the direction and/or power of the second uplink beam 218 is sufficiently changed from the original uplink beam 214 such that it both avoids the blockage condition and still enables the communication link to be closed (or the data exchange to continue).

In an aspect of the disclosure, the gNB 202 and the UE 204 may decide upon one or more alternative candidate uplink beams for closing the communication link (or continuing the data exchange) in case the blockage condition occurs with respect to a preferred uplink beam (e.g., uplink beam 214). For example, the gNB 202 may schedule to receive the uplink beam 214 from the UE 204 at time n+K2, where n is a current time and K2 is a parameter negotiated by the gNB 202 and the UE 204. Accordingly, if the UE 204 knows that it may not be able to use the preferred TX beam at n+K2, the UE 204 may transmit an indication signal (e.g., a scheduling request (SR)) prior to n+K2 to indicate that the UE 204 intends to use an alternative beam(s) for transmitting an uplink signal (e.g., physical uplink shared channel (PUSCH), physical uplink control channel (PUCCH), sounding reference signal (SRS), etc.). Notably, the parameter K2 should be long enough to give the UE 204 enough time to notify the gNB 202 of the alternative beam(s) via the scheduling request.

Figure 5:
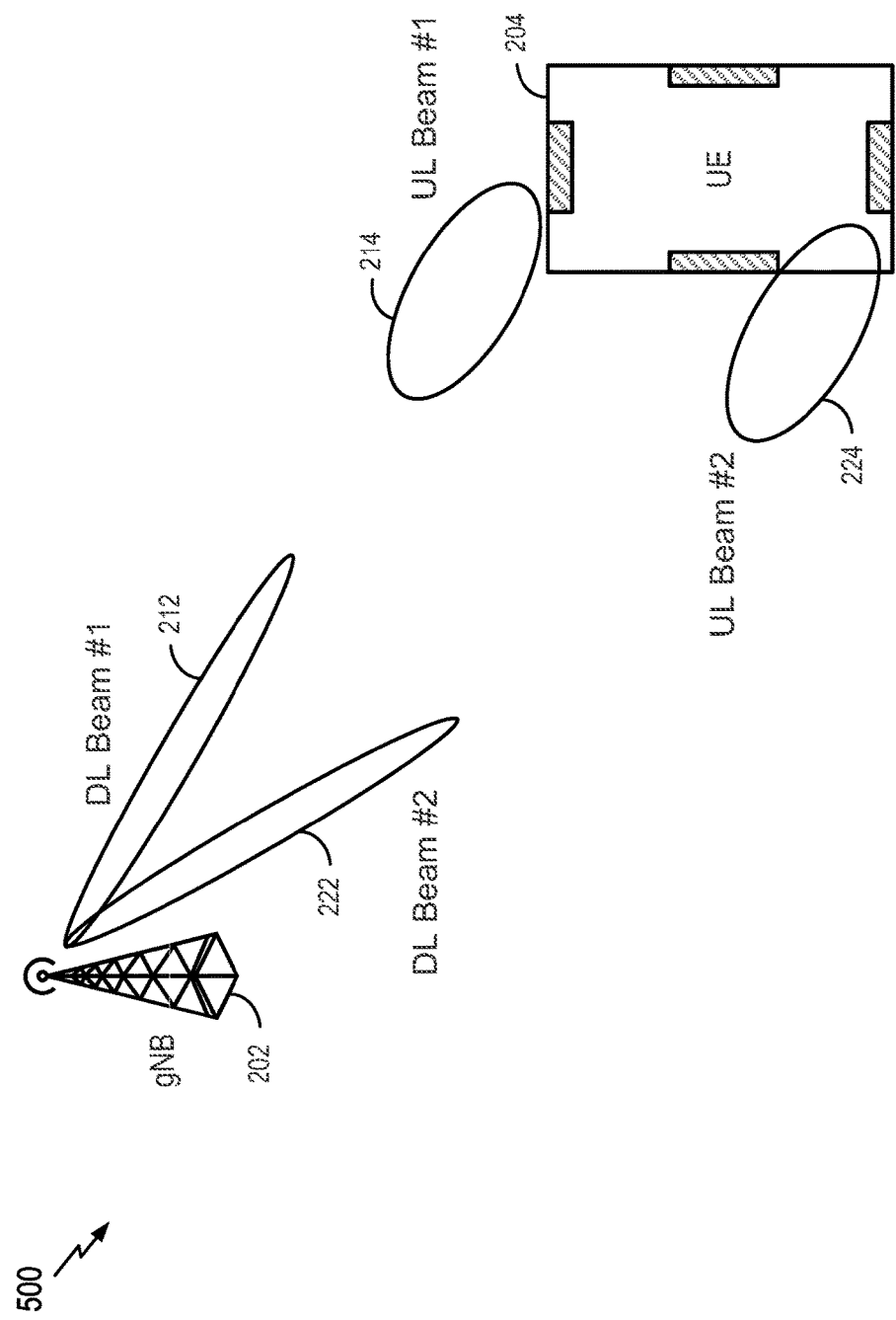
FIG. 5 is a diagram illustrating a communication system that includes the gNB and the UE in accordance with some further aspects of the disclosure.

FIG. 5 is a diagram 500 illustrating a communication system that includes the gNB 202 and the UE 204 according to some aspects of the disclosure. In an aspect of the disclosure, the gNB 202 and the UE 204 may maintain multiple beam pairs.

Data transfer may occur through a preferred beam pair. For example, the preferred beam pair may include a first downlink beam 212 (DL Beam #1) and a first uplink beam 214 (UL Beam #1) corresponding to the first downlink beam 212. One or more backup beam pairs may be maintained as a fallback option if the preferred beam pair is blocked. For example, a fallback beam pair may include a second downlink beam 222 (DL Beam #2) and a second uplink beam 224 (UL Beam #2) corresponding to the second downlink beam 222. Notably, the multiple beam pairs can be from different transmission points (TxPs). Although FIG. 5 shows a single TxP (a single gNB 202) transmitting multiple downlink beams (DL Beam #1 and DL Beam #2), the multiple downlink beams may be transmitted from two or more gNBs.

In an aspect of the disclosure, if the UE 204 determines that the preferred beam pair is blocked, the UE 204 may send an indication of the blockage using the fallback beam pair. The gNB 202 may monitor the fallback beam pair(s) using a lower duty cycle. The UE 204 may use an uplink control channel (e.g., via a scheduling request) to indicate the blocked event. The UE 204 may also indicate a maximum power limit from the moment of the blockage (i.e., indicate quality of the preferred beam pair). The UE 204 may later indicate a higher maximum power limit once the blockage condition (e.g. MPE condition) no longer exists, for example.

In an aspect of the disclosure, the fallback beam pair may be useful when applied to the techniques described above with respect to FIGS. 3 and 4. For example, with respect to FIG. 3, UE 204 may use the fallback beam pair to provide feedback information related to an uplink beam transmission power. The gNB 202 may use such information to make better power control decisions. In another example, with respect to FIG. 4, the UE 204 may use the fallback beam pair to provide feedback information related to a preferred uplink beam being blocked and/or the use of an alternative candidate beam for transmitting an uplink signal. The gNB 202 may use such information to adjust a scheduling behavior or probe a new beam for the UE 204.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure. The teachings herein can be implemented according to various network technologies including, without limitation, fifth generation (5G) technology, fourth generation (4G) technology, third generation (3G) technology, and other network architectures. Thus, various aspects of the disclosure may be extended to networks based on 3rd Generation Partnership Project (3GPP) Long Term Evolution (LTE), LTE-Advanced (LTE-A) (in FDD, TDD, or both modes), Universal Mobile Telecommunications System (UMTS), Global System for Mobile Communications (GSM), Code Division Multiple Access (CDMA), Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system. For purposes of illustration, the following may describe various aspects in the context of a 5G system and/or an LTE system. It should be appreciated, however, that the teachings herein may be employed in other systems as well. Thus, references to functionality in the context of 5G and/or LTE terminology should be understood to be equally applicable to other types of technology, networks, components, signaling, and so on.

First Example Apparatus

Figure 6:
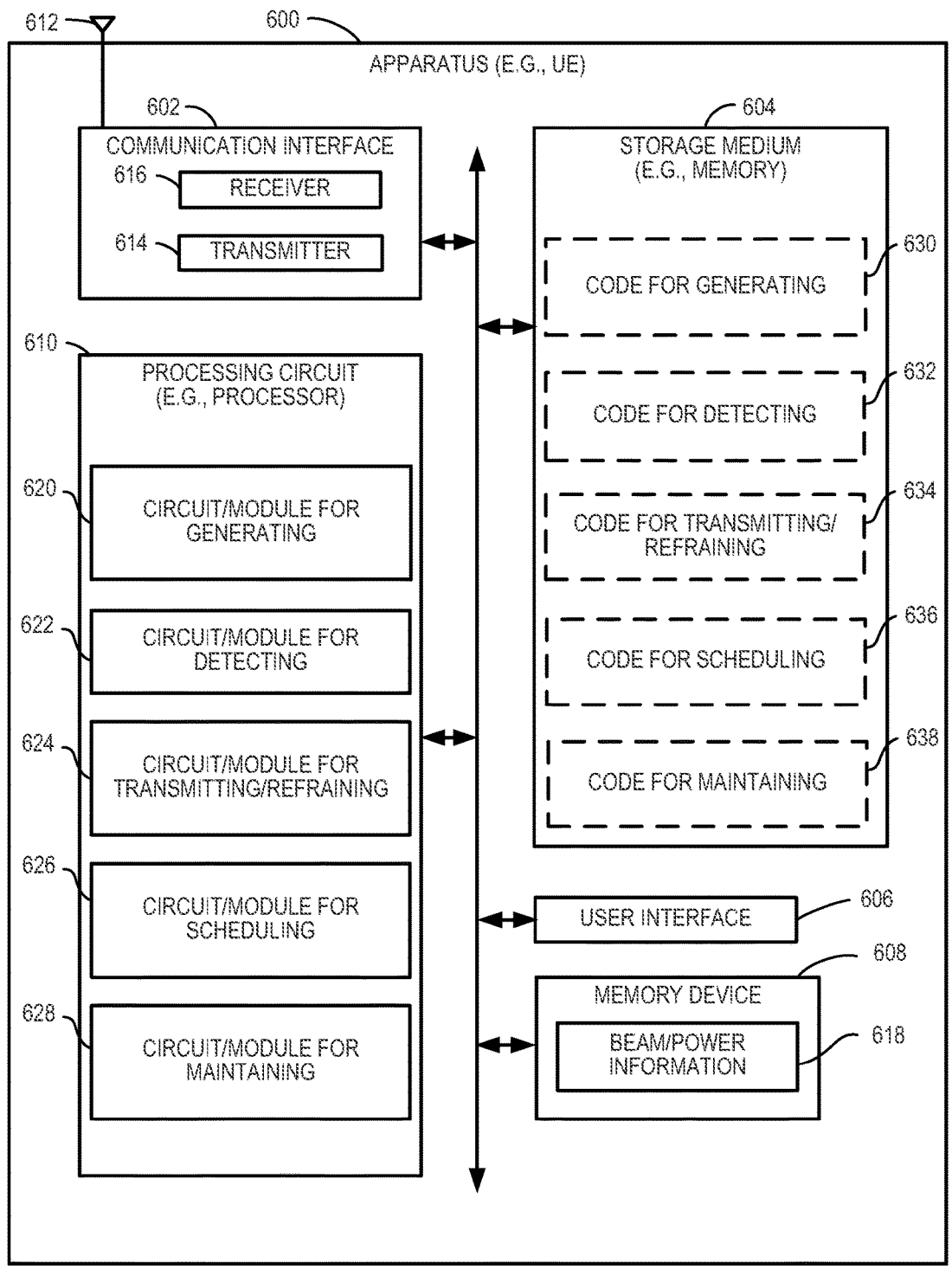
FIG. 6 is a block diagram illustrating an example hardware implementation for an apparatus (e.g., an electronic device) that can support communication in accordance with some aspects of the disclosure.

FIG. 6 illustrates a block diagram of an example hardware implementation of an apparatus 600 configured to communicate according to one or more aspects of the disclosure. The apparatus 600 could embody or be implemented within a UE, a CPE, a TRP, a base station (BS), an eNode B (eNB), a gNode B (gNB), or some other type of device that supports wireless communication. In various implementations, the apparatus 600 could embody or be implemented within an access terminal, an access point, or some other type of device. In various implementations, the apparatus 600 could embody or be implemented within a mobile phone, a smart phone, a tablet, a portable computer, a server, a personal computer, a sensor, an entertainment device, a medical device, or any other electronic device having circuitry.

The apparatus 600 includes a communication interface (e.g., at least one transceiver) 602, a storage medium 604, a user interface 606, a memory device (e.g., a memory circuit) 608, and a processing circuit 610 (e.g., at least one processor). In various implementations, the user interface 606 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 6. The signaling bus may include any number of interconnecting buses and bridges depending on the specific application of the processing circuit 610 and the overall design constraints. The signaling bus links together various circuits such that each of the communication interface 602, the storage medium 604, the user interface 606, and the memory device 608 are coupled to and/or in electrical communication with the processing circuit 610. The signaling bus may also link various other circuits (not shown) such as timing sources, peripherals, voltage regulators, and power management circuits, which are well known in the art, and therefore, will not be described any further.

The communication interface 602 provides a means for communicating with other apparatuses over a transmission medium. In some implementations, the communication interface 602 includes circuitry and/or programming adapted to facilitate the communication of information bi-directionally with respect to one or more communication devices in a network. In some implementations, the communication interface 602 is adapted to facilitate wireless communication of the apparatus 600. In these implementations, the communication interface 602 may be coupled to one or more antennas 612 as shown in FIG. 6 for wireless communication within a wireless communication system. The communication interface 602 can be configured with one or more standalone receivers and/or transmitters, as well as one or more transceivers. In the illustrated example, the communication interface 602 includes a transmitter 614 and a receiver 616. The communication interface 602 serves as one example of a means for receiving and/or means transmitting.

The memory device 608 may represent one or more memory devices. As indicated, the memory device 608 may maintain beam information or power information 618 along with other information used by the apparatus 600. In some implementations, the memory device 608 and the storage medium 604 are implemented as a common memory component. The memory device 608 may also be used for storing data that is manipulated by the processing circuit 610 or some other component of the apparatus 600.

The storage medium 604 may represent one or more computer-readable, machine-readable, and/or processor-readable devices for storing programming, such as processor executable code or instructions (e.g., software, firmware), electronic data, databases, or other digital information. The storage medium 604 may also be used for storing data that is manipulated by the processing circuit 610 when executing programming. The storage medium 604 may be any available media that can be accessed by a general purpose or special purpose processor, including portable or fixed storage devices, optical storage devices, and various other mediums capable of storing, containing or carrying programming By way of example and not limitation, the storage medium 604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 604 may be embodied in an article of manufacture (e.g., a computer program product). By way of example, a computer program product may include a computer-readable medium in packaging materials. In view of the above, in some implementations, the storage medium 604 may be a non-transitory (e.g., tangible) storage medium.

The storage medium 604 may be coupled to the processing circuit 610 such that the processing circuit 610 can read information from, and write information to, the storage medium 604. That is, the storage medium 604 can be coupled to the processing circuit 610 so that the storage medium 604 is at least accessible by the processing circuit 610, including examples where at least one storage medium is integral to the processing circuit 610 and/or examples where at least one storage medium is separate from the processing circuit 610 (e.g., resident in the apparatus 600, external to the apparatus 600, distributed across multiple entities, etc.).

Programming stored by the storage medium 604, when executed by the processing circuit 610, causes the processing circuit 610 to perform one or more of the various functions and/or process operations described herein. For example, the storage medium 604 may include operations configured for regulating operations at one or more hardware blocks of the processing circuit 610, as well as to utilize the communication interface 602 for wireless communication utilizing their respective communication protocols.

The processing circuit 610 is generally adapted for processing, including the execution of such programming stored on the storage medium 604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 610 is arranged to obtain, process and/or send data, control data access and storage, issue commands, and control other desired operations. The processing circuit 610 may include circuitry configured to implement desired programming provided by appropriate media in at least one example. For example, the processing circuit 610 may be implemented as one or more processors, one or more controllers, and/or other structure configured to execute executable programming Examples of the processing circuit 610 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 610 are for illustration and other suitable configurations within the scope of the disclosure are also contemplated.

According to one or more aspects of the disclosure, the processing circuit 610 may be adapted to perform any or all of the features, processes, functions, operations and/or routines for any or all of the apparatuses described herein. For example, the processing circuit 610 may be configured to perform any of the steps, functions, and/or processes described with respect to FIG. 1-5 or 7. As used herein, the term "adapted" in relation to the processing circuit 610 may refer to the processing circuit 610 being one or more of configured, employed, implemented, and/or programmed to perform a particular process, function, operation and/or routine according to various features described herein.

The processing circuit 610 may be a specialized processor, such as an application-specific integrated circuit (ASIC) that serves as a means for (e.g., structure for) carrying out any one of the operations described in conjunction with FIG. 1-5 or 7. The processing circuit 610 serves as one example of a means for transmitting and/or a means for receiving.

According to at least one example of the apparatus 600, the processing circuit 610 may include one or more of a circuit/module for generating 620, a circuit/module for detecting 622, a circuit/module for transmitting/refraining 624, a circuit/module for scheduling 626, or a circuit/module for maintaining 628.

As mentioned above, programming stored by the storage medium 604, when executed by the processing circuit 610, causes the processing circuit 610 to perform one or more of the various functions and/or process operations described herein. For example, the programming, when executed by the processing circuit 610, may cause the processing circuit 610 to perform the various functions, steps, and/or processes described herein with respect to FIG. 1-5 or 7 in various implementations. As shown in FIG. 6, the storage medium 604 may include one or more of code for generating 630, code for detecting 632, code for transmitting/refraining 634, code for scheduling 636, or code for maintaining 638.

First Example Process

Figure 7:
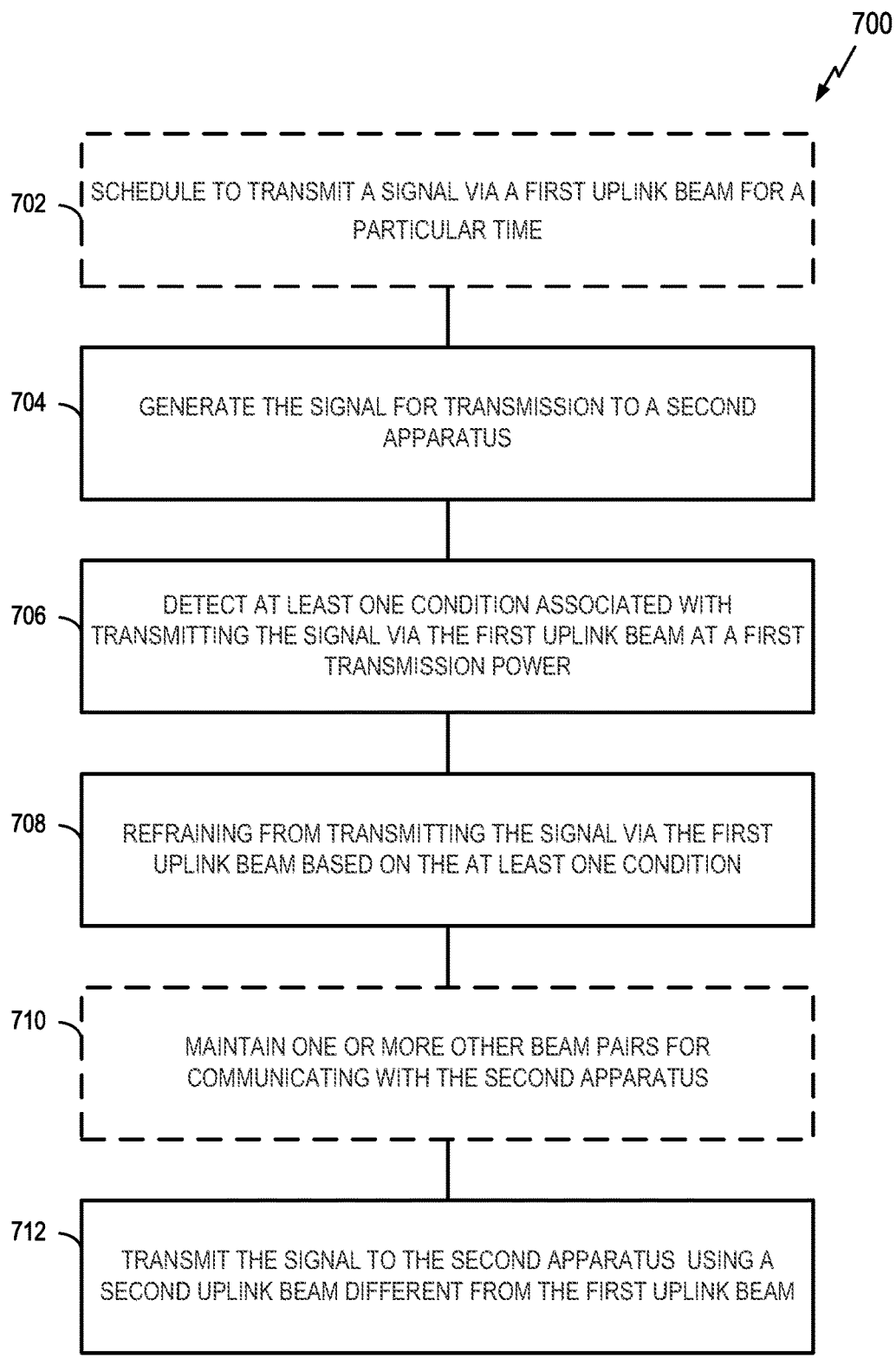
FIG. 7 is a flowchart illustrating an example of a communication process in accordance with some aspects of the disclosure.

FIG. 7 illustrates a process 700 for communication (or a method of communication) in accordance with some aspects of the disclosure. The process 700 may take place within a processing circuit (e.g., the processing circuit 610 of FIG. 6), which may be located in a UE, a CPE, a TRP, a BS, an eNB, a gNB, or some other suitable apparatus. Of course, in various aspects within the scope of the disclosure, the process 700 may be implemented by any suitable apparatus capable of supporting communication-related operations.

At block 702, an apparatus (e.g., a UE, or CPE) may optionally schedule to transmit a signal via a first uplink beam for a particular time with a second apparatus. At block 704, the apparatus generates the signal for transmission to the second apparatus.

At block 706, the apparatus detects at least one condition (e.g., a restrictive condition) associated with transmitting the signal via the first uplink beam at a first transmission power. The at least one condition may include the first uplink beam exceeding a maximum permissible exposure (MPE) limit.

At block 708, the apparatus refrains from transmitting the signal via the first uplink beam based on the at least one condition. In one aspect, the apparatus refrains from transmitting the signal at the particular time scheduled.

In an aspect, a first beam pair for communicating the signal includes a first downlink beam transmitted by the second apparatus and the first uplink beam corresponding to the first downlink beam. At block 710, the apparatus may optionally be configured for maintaining one or more other beam pairs for communicating with the second apparatus. The one or more other beam pairs may include at least one other downlink beam transmitted by the second apparatus and at least one other uplink beam transmitted by the apparatus corresponding to the at least one other downlink beam. Accordingly, the apparatus may indicate to the second apparatus using the one or more other beam pairs that the signal is not transmitted via the first uplink beam. Additionally or alternatively, the apparatus may indicate to the second apparatus using the one or more other beam pairs a maximum allowable transmission power for transmitting the signal when the signal is not transmitted via the first uplink beam.

At block 712, the apparatus transmits the signal to the second apparatus using a second uplink beam different from the first uplink beam. For example, the apparatus may determine an amount for a power backoff such that the second uplink beam does not exceed the MPE limit, subtract the amount for the power backoff from the first transmission power to determine a second transmission power, and transmit the signal via the second uplink beam at the second transmission power, wherein the second uplink beam is directed in a same direction as the first uplink beam. In another example, the apparatus may select the second uplink beam that does not exceed the MPE limit and transmit the signal via the second uplink beam at the first transmission power, wherein the second uplink beam is directed in a different direction than the first uplink beam. The apparatus may further indicate, to the second apparatus prior to the particular time scheduled, one or more uplink beams other than the first uplink beam for transmitting the signal, wherein the one or more uplink beams includes the second uplink beam. In one aspect, the signal is transmitted to establish a communication link with the second apparatus. In another aspect, the signal is transmitted to continue an established communication with the second apparatus.

In some aspects, the process 700 may include any combination of the above operations.

Second Example Apparatus

Figure 8:
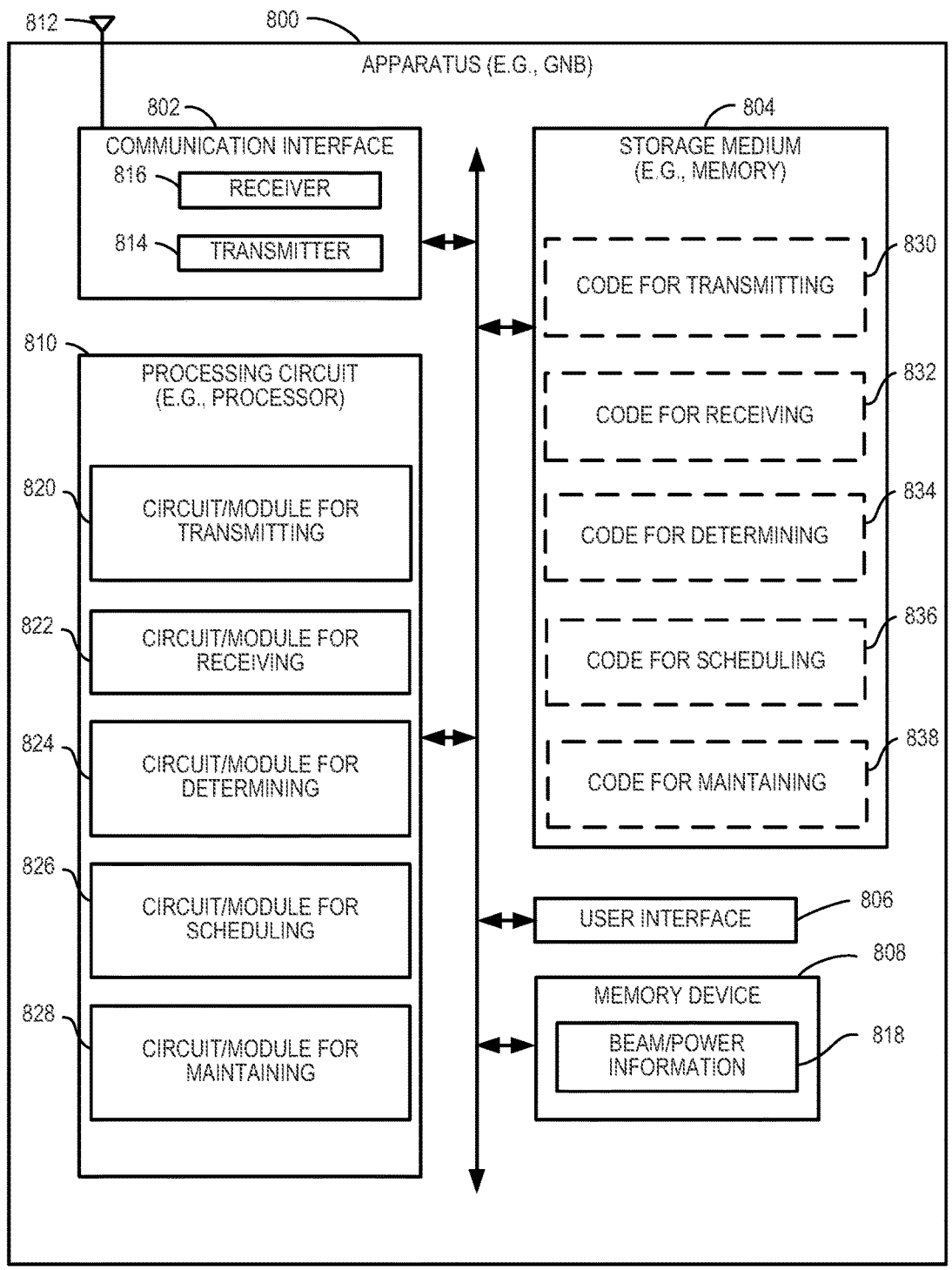
FIG. 8 is a block diagram illustrating an example hardware implementation for an apparatus (e.g., an electronic device) that can support communication in accordance with some aspects of the disclosure.

FIG. 8 illustrates a block diagram of an example hardware implementation of an apparatus 800 configured to communicate according to one or more aspects of the disclosure. The apparatus 800 could embody or be implemented within a TRP, a base station (BS), an eNode B (eNB), a gNode B (gNB), a UE, a CPE, or some other type of device that supports wireless communication. In various implementations, the apparatus 800 could embody or be implemented within an access terminal, an access point, or some other type of device. In various implementations, the apparatus 800 could embody or be implemented within a mobile phone, a smart phone, a tablet, a portable computer, a server, a personal computer, a sensor, an entertainment device, a medical device, or any other electronic device having circuitry.

The apparatus 800 includes a communication interface (e.g., at least one transceiver) 802, a storage medium 804, a user interface 806, a memory device 808 (e.g., storing beam information or power information 818), and a processing circuit 810 (e.g., at least one processor). In various implementations, the user interface 806 may include one or more of: a keypad, a display, a speaker, a microphone, a touchscreen display, of some other circuitry for receiving an input from or sending an output to a user. The communication interface 802 may be coupled to one or more antennas 812, and may include a transmitter 814 and a receiver 816. In general, the components of FIG. 8 may be similar to corresponding components of the apparatus 600 of FIG. 6.

According to one or more aspects of the disclosure, the processing circuit 810 may be adapted to perform any or all of the features, processes, functions, operations and/or routines for any or all of the apparatuses described herein. For example, the processing circuit 810 may be configured to perform any of the steps, functions, and/or processes described with respect to FIG. 1-5 or 9. As used herein, the term "adapted" in relation to the processing circuit 810 may refer to the processing circuit 810 being one or more of configured, employed, implemented, and/or programmed to perform a particular process, function, operation and/or routine according to various features described herein.

The processing circuit 810 may be a specialized processor, such as an application-specific integrated circuit (ASIC) that serves as a means for (e.g., structure for) carrying out any one of the operations described in conjunction with FIG. 1-5 or 9. The processing circuit 810 serves as one example of a means for transmitting and/or a means for receiving.

According to at least one example of the apparatus 800, the processing circuit 810 may include one or more of a circuit/module for transmitting 820, a circuit/module for receiving 822, a circuit/module for determining 824, a circuit/module for scheduling 826, or a circuit/module for maintaining 828.

As mentioned above, programming stored by the storage medium 804, when executed by the processing circuit 810, causes the processing circuit 810 to perform one or more of the various functions and/or process operations described herein. For example, the programming, when executed by the processing circuit 810, may cause the processing circuit 810 to perform the various functions, steps, and/or processes described herein with respect to FIG. 1-5 or 9 in various implementations. As shown in FIG. 8, the storage medium 804 may include one or more of code for transmitting 830, code for receiving 832, code for determining 834, code for scheduling 836, or code for maintaining 838.

Second Example Process

Figure 9:
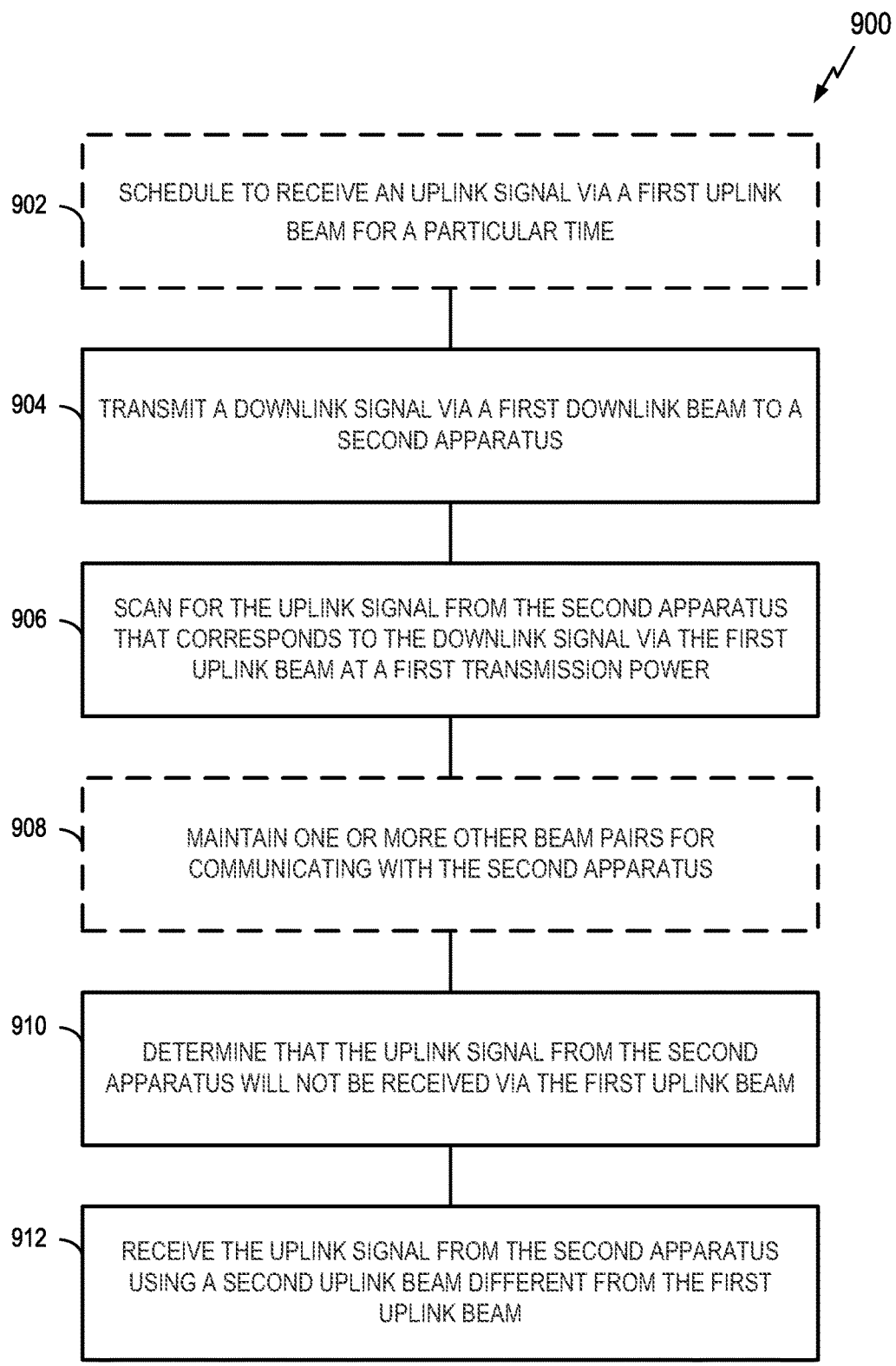
FIG. 9 is a flowchart illustrating an example of a communication process in accordance with some aspects of the disclosure.

FIG. 9 illustrates a process 900 for communication (or a method of communication) in accordance with some aspects of the disclosure. The process 900 may take place within a processing circuit (e.g., the processing circuit 810 of FIG. 8), which may be located in a TRP, a BS, an eNB, a gNB, a UE, a CPE, or some other suitable apparatus. Of course, in various aspects within the scope of the disclosure, the process 900 may be implemented by any suitable apparatus capable of supporting communication-related operations.

At block 902, an apparatus (e.g., a gNB) may optionally schedule to receive an uplink signal via a first uplink beam for a particular time with a second apparatus. At block 904, the apparatus transmits a downlink signal via a first downlink beam to the second apparatus.

At block 906, the apparatus scans for the uplink signal from the second apparatus that corresponds to the downlink signal via the first uplink beam at a first transmission power.

In an aspect, a first beam pair for communicating the uplink signal includes the first downlink beam and the first uplink beam corresponding to the first downlink beam. At block 908, the apparatus may optionally maintain one or more other beam pairs for communicating with the second apparatus. The one or more other beam pairs may include at least one other downlink beam transmitted by the apparatus and at least one other uplink beam transmitted by the second apparatus corresponding to the at least one other downlink beam.

At block 910, the apparatus determines that the uplink signal from the second apparatus will not be received via the first uplink beam. For example, the apparatus may receive, from the second apparatus using the one or more other beam pairs, an indication that the uplink signal is not transmitted via the first uplink beam. In another example, the apparatus may receive, from the second apparatus using the one or more other beam pairs, an indication of a maximum allowable transmission power for transmitting the uplink signal.

At block 912, the apparatus receives the uplink signal from the second apparatus using a second uplink beam different from the first uplink beam. For example, the apparatus may receive the uplink signal via the second uplink beam at a second transmission power less than the first transmission power, wherein the second uplink beam is directed in a same direction as the first uplink beam. In another example, the apparatus may receive the uplink signal via the second uplink beam at the first transmission power, wherein the second uplink beam is directed in a different direction than the first uplink beam. The apparatus may further receive, from the second apparatus prior to the particular time scheduled, an indication of one or more uplink beams other than the first uplink beam for receiving the uplink signal, wherein the one or more uplink beams includes the second uplink beam. In one aspect, the uplink signal is received to establish a communication link with the second apparatus. In another aspect, the uplink signal is received to continue an established communication with the second apparatus.

In some aspects, the process 900 may include any combination of the above operations.

Additional Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner Also, unless stated otherwise a set of elements may include one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

What is claimed is:

1. A method of communication at a first apparatus, comprising:
   generating a signal for transmission to a second apparatus;
   detecting at least one condition associated with transmitting the signal via a first uplink beam at a first transmission power, wherein the at least one condition includes the first uplink beam exceeding a maximum permissible exposure limit;
   refraining from transmitting the signal via the first uplink beam based on the at least one condition; and
   transmitting the signal to the second apparatus using a second uplink beam different from the first uplink beam, wherein the second uplink beam is directed in a same direction as the first uplink beam or a different direction than the first uplink beam,
   wherein if the second uplink beam is directed in the same direction as the first uplink beam, the transmitting the signal to the second apparatus includes:
      determining an amount for a power backoff such that the second uplink beam does not exceed the maximum permissible exposure limit,
      reducing the first transmission power to a second transmission power in accordance with the amount for the power backoff, and
      transmitting the signal via the second uplink beam at the second transmission power.

2. The method of claim 1,
   wherein the reducing the first transmission power to the second transmission power includes subtracting the amount for the power backoff from the first transmission power to determine the second transmission power.

3. The method of claim 1, wherein if the second uplink beam is directed in the different direction than the first uplink beam, the transmitting the signal to the second apparatus includes:
  selecting the second uplink beam that does not exceed the maximum permissible exposure limit; and
  transmitting the signal via the second uplink beam at the first transmission power.

4. The method of claim 1, wherein the signal is transmitted to:
  establish a communication link with the second apparatus; or
  continue an established communication with the second apparatus.

5. A method of communication at a first apparatus, comprising:
  generating a signal for transmission to a second apparatus;
  scheduling to transmit the signal via a first uplink beam for a particular time with the second apparatus;
  detecting at least one condition associated with transmitting the signal via the first uplink beam at a first transmission power, wherein the at least one condition includes the first uplink beam exceeding a maximum permissible exposure limit;
  refraining from transmitting the signal via the first uplink beam based on the at least one condition, wherein the signal is not transmitted via the first uplink beam at the particular time; and
  transmitting the signal to the second apparatus using a second uplink beam different from the first uplink beam, wherein the transmitting the signal to the second apparatus includes:
    indicating, to the second apparatus prior to the particular time, one or more uplink beams other than the first uplink beam for transmitting the signal, wherein the one or more uplink beams includes the second uplink beam,
    selecting the second uplink beam that does not exceed the maximum permissible exposure limit, and
    transmitting the signal via the second uplink beam at the first transmission power, wherein the second uplink beam is directed in a different direction than the first uplink beam.

6. A method of communication at a first apparatus, comprising:
  generating a signal for transmission to a second apparatus;
  detecting at least one condition associated with transmitting the signal via a first uplink beam at a first transmission power;
  refraining from transmitting the signal via the first uplink beam based on the at least one condition; and
  transmitting the signal to the second apparatus using a second uplink beam different from the first uplink beam,
  wherein a first beam pair for communicating the signal includes a first downlink beam transmitted by the second apparatus and the first uplink beam corresponding to the first downlink beam, the method further including:
    maintaining one or more other beam pairs for communicating with the second apparatus, the one or more other beam pairs including at least one other downlink beam transmitted by the second apparatus and at least one other uplink beam transmitted by the first apparatus corresponding to the at least one other downlink beam.

7. The method of claim 6, further including at least one of:
  indicating to the second apparatus using the one or more other beam pairs that the signal is not transmitted via the first uplink beam; or
  indicating to the second apparatus using the one or more other beam pairs a maximum allowable transmission power for transmitting the signal when the signal is not transmitted via the first uplink beam.

8. An apparatus for communication, comprising:
  a memory device; and
  a processing circuit coupled to the memory device and configured to:
    generate a signal for transmission to a second apparatus,
    detect at least one condition associated with transmitting the signal via a first uplink beam at a first transmission power, wherein the at least one condition includes the first uplink beam exceeding a maximum permissible exposure limit,
    refrain from transmitting the signal via the first uplink beam based on the at least one condition, and
    transmit the signal to the second apparatus using a second uplink beam different from the first uplink beam, wherein the second uplink beam is directed in a same direction as the first uplink beam or a different direction than the first uplink beam,
  wherein if the second uplink beam is directed in the same direction as the first uplink beam, the processing circuit configured to transmit the signal to the second apparatus is further configured to:
    determine an amount for a power backoff such that the second uplink beam does not exceed the maximum permissible exposure limit,
    reduce the first transmission power to a second transmission power in accordance with the amount for the power backoff, and
    transmit the signal via the second uplink beam at the second transmission power.

9. The apparatus of claim 8,
  wherein the processing circuit configured to reduce the first transmission power to the second transmission power is configured to subtract the amount for the power backoff from the first transmission power to determine the second transmission power.

10. The apparatus of claim 8, wherein if the second uplink beam is directed in the different direction than the first uplink beam, the processing circuit configured to transmit the signal to the second apparatus is further configured to:
  select the second uplink beam that does not exceed the maximum permissible exposure limit; and
  transmit the signal via the second uplink beam at the first transmission power.

11. The apparatus of claim 8, wherein the signal is transmitted to:
  establish a communication link with the second apparatus; or
  continue an established communication with the second apparatus.

12. An apparatus for communication, comprising:
  a memory device; and
  a processing circuit coupled to the memory device and configured to:
    generate a signal for transmission to a second apparatus,
    schedule to transmit the signal via a first uplink beam for a particular time with the second apparatus,
    detect at least one condition associated with transmitting the signal via the first uplink beam at a first transmission power, wherein the at least one condition includes the first uplink beam exceeding a maximum permissible exposure limit, refrain from transmitting the signal via the first uplink beam based on the at least one condition, wherein the signal is not transmitted via the first uplink beam at the particular time, and transmit the signal to the second apparatus using a second uplink beam different from the first uplink beam, wherein the processing circuit configured to transmit the signal to the second apparatus is further configured to:

indicate, to the second apparatus prior to the particular time, one or more uplink beams other than the first uplink beam for transmitting the signal, wherein the one or more uplink beams includes the second uplink beam, select the second uplink beam that does not exceed the maximum permissible exposure limit, and transmit the signal via the second uplink beam at the first transmission power, wherein the second uplink beam is directed in a different direction than the first uplink beam.

13. An apparatus for communication, comprising:
a memory device; and
a processing circuit coupled to the memory device and configured to:
generate a signal for transmission to a second apparatus,
detect at least one condition associated with transmitting the signal via a first uplink beam at a first transmission power,
refrain from transmitting the signal via the first uplink beam based on the at least one condition, and
transmit the signal to the second apparatus using a second uplink beam different from the first uplink beam,
wherein a first beam pair for communicating the signal includes a first downlink beam transmitted by the second apparatus and the first uplink beam corresponding to the first downlink beam, the processing circuit further configured to:
maintain one or more other beam pairs for communicating with the second apparatus, the one or more other beam pairs including at least one other downlink beam transmitted by the second apparatus and at least one other uplink beam transmitted by the apparatus corresponding to the at least one other downlink beam.

14. The apparatus of claim 13, wherein the processing circuit is further configured to at least one of:
indicate to the second apparatus using the one or more other beam pairs that the signal is not transmitted via the first uplink beam; or
indicate to the second apparatus using the one or more other beam pairs a maximum allowable transmission power for transmitting the signal when the signal is not transmitted via the first uplink beam.

15. A non-transitory computer-readable medium of a first apparatus storing computer-executable code, including code to:
generate a signal for transmission to a second apparatus;
detect at least one condition associated with transmitting the signal via a first uplink beam at a first transmission power, wherein the at least one condition includes the first uplink beam exceeding a maximum permissible exposure limit;

refrain from transmitting the signal via the first uplink beam based on the at least one condition; and transmit the signal to the second apparatus using a second uplink beam different from the first uplink beam, wherein the second uplink beam is directed in a same direction as the first uplink beam or a different direction than the first uplink beam, wherein if the second uplink beam is directed in the same direction as the first uplink beam, the code to transmit the signal to the second apparatus is configured to:

determine an amount for a power backoff such that the second uplink beam does not exceed the maximum permissible exposure limit, reduce the first transmission power to a second transmission power in accordance with the amount for the power backoff, and transmit the signal via the second uplink beam at the second transmission power.

16. The non-transitory computer-readable medium of claim 15,
wherein the code configured to reduce the first transmission power to the second transmission power is configured to subtract the amount for the power backoff from the first transmission power to determine the second transmission power.

17. The non-transitory computer-readable medium of claim 15, wherein if the second uplink beam is directed in the different direction than the first uplink beam, the code to transmit the signal to the second apparatus is configured to:
select the second uplink beam that does not exceed the maximum permissible exposure limit; and
transmit the signal via the second uplink beam at the first transmission power.

18. The non-transitory computer-readable medium of claim 15, wherein the signal is transmitted to:
establish a communication link with the second apparatus; or
continue an established communication with the second apparatus.

19. A non-transitory computer-readable medium of a first apparatus storing computer-executable code, including code to:
generate a signal for transmission to a second apparatus;
schedule to transmit the signal via a first uplink beam for a particular time with the second apparatus;
detect at least one condition associated with transmitting the signal via the first uplink beam at a first transmission power, wherein the at least one condition includes the first uplink beam exceeding a maximum permissible exposure limit;
refrain from transmitting the signal via the first uplink beam based on the at least one condition, wherein the signal is not transmitted via the first uplink beam at the particular time; and
transmit the signal to the second apparatus using a second uplink beam different from the first uplink beam, wherein the code to transmit the signal to the second apparatus is configured to:
indicate, to the second apparatus prior to the particular time, one or more uplink beams other than the first uplink beam for transmitting the signal, wherein the one or more uplink beams includes the second uplink beam,
select the second uplink beam that does not exceed the maximum permissible exposure limit, and transmit the signal via the second uplink beam at the first transmission power, wherein the second uplink beam is directed in a different direction than the first uplink beam.

20. A non-transitory computer-readable medium of a first apparatus storing computer-executable code, including code to:
generate a signal for transmission to a second apparatus;
detect at least one condition associated with transmitting the signal via a first uplink beam at a first transmission power;
refrain from transmitting the signal via the first uplink beam based on the at least one condition; and
transmit the signal to the second apparatus using a second uplink beam different from the first uplink beam,
wherein a first beam pair for communicating the signal includes a first downlink beam transmitted by the second apparatus and the first uplink beam corresponding to the first downlink beam, the computer-executable code further including code to:
maintain one or more other beam pairs for communicating with the second apparatus, the one or more other beam pairs including at least one other downlink beam transmitted by the second apparatus and at least one other uplink beam transmitted by the first apparatus corresponding to the at least one other downlink beam.

21. The non-transitory computer-readable medium of claim 20, wherein the computer-executable code is further including code to at least one of:
indicate to the second apparatus using the one or more other beam pairs that the signal is not transmitted via the first uplink beam; or
indicate to the second apparatus using the one or more other beam pairs a maximum allowable transmission power for transmitting the signal when the signal is not transmitted via the first uplink beam.

22. An apparatus for communication, comprising:
a memory device; and
a processing circuit coupled to the memory device and configured to:
transmit a downlink signal via a first downlink beam to a second apparatus,
scan for an uplink signal from the second apparatus that corresponds to the downlink signal via a first uplink beam at a first transmission power,
determine that the uplink signal from the second apparatus will not be transmitted via the first uplink beam from the second apparatus, and
receive the uplink signal from the second apparatus via a second uplink beam transmitted from the second apparatus, the second uplink beam different from the first uplink beam, wherein the second uplink beam is transmitted at a second transmission power less than the first transmission power and the second uplink beam is directed in a same direction as the first uplink beam.

23. The apparatus of claim 22, wherein the uplink signal is received to:
establish a communication link with the second apparatus; or
continue an established communication with the second apparatus.

24. An apparatus for communication, comprising:
a memory device; and
a processing circuit coupled to the memory device and configured to:
transmit a downlink signal via a first downlink beam to a second apparatus,
schedule to receive an uplink signal via a first uplink beam for a particular time with the second apparatus,
scan for the uplink signal from the second apparatus that corresponds to the downlink signal via the first uplink beam at a first transmission power,
receive, from the second apparatus prior to the particular time, an indication of one or more uplink beams other than the first uplink beam for transmitting the uplink signal, wherein the one or more uplink beams includes a second uplink beam different from the first uplink beam,
determine that the uplink signal from the second apparatus will not be transmitted via the first uplink beam from the second apparatus, and
receive the uplink signal from the second apparatus via a second uplink beam transmitted from the second apparatus, the second uplink beam different from the first uplink beam,
wherein the processing circuit configured to receive the uplink signal from the second apparatus is further configured to receive the uplink signal via the second uplink beam transmitted from the second apparatus at the first transmission power, wherein the second uplink beam is directed in a different direction than the first uplink beam.

25. An apparatus for communication, comprising:
a memory device; and
a processing circuit coupled to the memory device and configured to:
transmit a downlink signal via a first downlink beam to a second apparatus,
scan for an uplink signal from the second apparatus that corresponds to the downlink signal via a first uplink beam at a first transmission power,
determine that the uplink signal from the second apparatus will not be transmitted via the first uplink beam from the second apparatus, and
receive the uplink signal from the second apparatus via a second uplink beam transmitted from the second apparatus, the second uplink beam different from the first uplink beam,
wherein a first beam pair for communicating the uplink signal includes the first downlink beam and the first uplink beam corresponding to the first downlink beam, the processing circuit further configured to:
maintain one or more other beam pairs for communicating with the second apparatus, the one or more other beam pairs including at least one other downlink beam transmitted by the apparatus and at least one other uplink beam transmitted by the second apparatus corresponding to the at least one other downlink beam.

26. The apparatus of claim 25, wherein the processing circuit configured to determine is further configured to at least one of:
receive, from the second apparatus using the one or more other beam pairs, an indication that the uplink signal is not transmitted via the first uplink beam; or
receive, from the second apparatus using the one or more other beam pairs, an indication of a maximum allowable transmission power for transmitting the uplink sign.

* * * * *